Oct. 4, 1932.                H. E. SORG                 1,880,991

SCANNING SCREEN

Filed Aug. 24, 1931

INVENTOR.
HAROLD E. SORG
BY Charles S. Evans
HIS ATTORNEY

Patented Oct. 4, 1932

1,880,991

UNITED STATES PATENT OFFICE

HAROLD E. SORG, OF SAN CARLOS, CALIFORNIA, ASSIGNOR TO CHARLES S. EVANS, OF OAKLAND, CALIFORNIA

SCANNING SCREEN

Application filed August 24, 1931. Serial No. 558,953.

My invention relates to the scanning screen of mechanical scanners used in television systems, and particularly to a screen having a plurality of spot-like light passages arranged so that each is adapted to scan a line across a scene or picture, such as the spiral arrangement of holes in the Nipkow disk.

The broad object of my invention is to improve the Nipkow scanning disk.

It is among the specific objects of my invention to provide a scanning screen which will scan a sufficiently large number of lines per inch to produce a picture which has enough detail to give pleasing reproduction of an object or scene.

Another object of my invention is to provide a scanning screen in which minute light passages may be easily and accurately formed and positioned.

A further object of my invention is to eliminate the problems and limitations connected with the mechanical fabrication of the Nipkow disk, such as the drilling of a large number of small and accurately positioned holes.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing.

Figure 1:
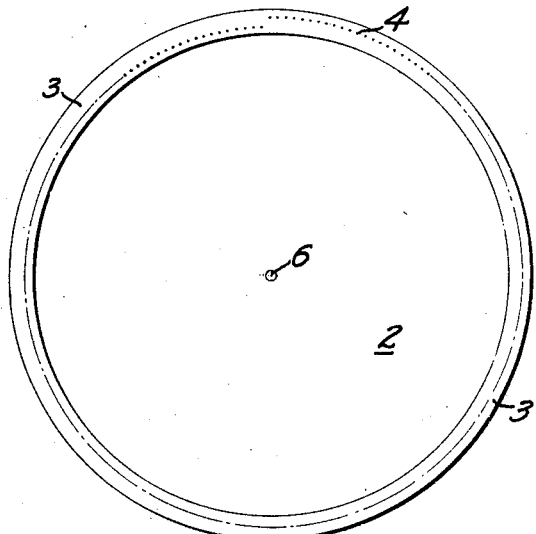
Figure 1 is a front elevational view of a scanning disk embodying the improvements of my invention.

Up to the present time the most satisfactory mechanical scanners developed employ a disk-like scanning screen, known as the Nipkow disk. This scanning screen is merely an opaque disk, usually metal, in which a series of spirally arranged holes are drilled or otherwise formed to provide light passages. The wide-spread use of this type of scanning screen or disk is due largely to its utter simplicity. This disk however has a serious drawback in that the number of lines scanned per inch is equal to and consequently limited by the number of holes that can be drilled or otherwise formed.

The small size of the holes and the accuracy with which each has to be positioned introduces problems in mechanical fabrication which limit the number of holes that can be formed and consequently the number of lines that the disk can scan per inch. It is practical to construct a disk in this manner which will scan around fifty lines per inch, but not a materially greater number of lines. In fact, the outside limit seems to be around seventy-five lines per inch. In order to give pleasing clarity a scene or picture should be scanned to at least one hundred and fifty lines, or more.

The broad object of my invention is to provide a scanning screen or disk which has all the advantages of simplicity found in the Nipkow disk, and at the same time eliminates the problems of mechanical fabrication connected therewith and makes it possible to easily construct the screen to scan as high as two hundred lines per inch, or more.

In terms of broad inclusion, the scanning screen embodying my invention comprises a movably mounted transparent sheet positioned to extend across the path of the scanning rays. The sheet is provided with an opaque coating having transparent spots therein; the latter being positioned so that movement of the screen results in the spots being moved in succession across the path.

The screen is preferably in the form of a rotatable disk, similar in nature to the well known Nipkow disk. In its preferred form the disk is of a transparent material, such as glass. The coating applied on the disk is preferably of a light sensitive nature, and the general opaqueness of the coating with the transparent spots spirally arranged therein is preferably photographically produced. In other words, the disk is a photographic negative.

In a variant form of the disk construction, the disk may be made of metal or any other suitable material and is provided with a plurality of apertures or slots adjacent its periphery. The transparent sheet in this case is a photographic film having an opaque area with the transparent spots therein photographically produced. Any suitable clamp means or an adhesive may be used to secure the film to the disk.

An alternate construction comprises forming the screen in the nature of a drum. In this case a photographic film is preferably used; the coating of the film being generally opaque with transparent spots therein arranged in a helix. This form of scanner may be used in a manner similar to the ordinary drum type of scanner.

Figure 2:
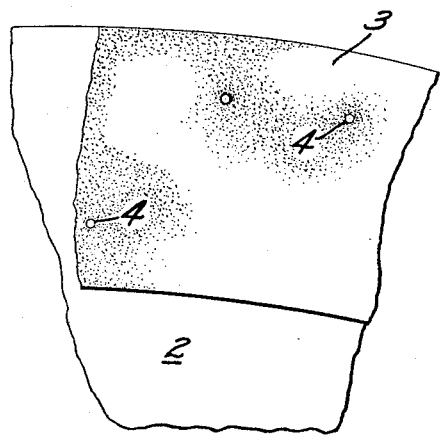
Figure 2 is an enlarged fragmentary view showing peripheral portions of the transparent disk shown in Figure 1, and illustrates more clearly that the light passages are formed by transparent spots in an opaque coating.

In greater detail, and referring particularly to the embodiment of my invention shown in Figures 1 and 2, the scanning screen is in the nature of a disk having spot-like light passages arranged in a spiral, similar to the spiral arrangement of holes in the Nipkow scanning disk. In my scanning screen however the disk 2 is preferably of a transparent material, such as glass, and is provided adjacent its periphery with an opaque coating 3 having transparent spots 4 therein providing the light passages.

The disk 2 is also provided with a central aperture 6, so that the disk may be mounted for rotation with the shaft of a synchronous motor or other suitable drive means. The operation of the disk will not be dealt with in detail, because it is the same as that of the Nipkow disk and consequently will be well understood by those skilled in the art. Briefly, it is sufficient to say that the disk is positioned to extend across the path of the scanning rays so that when it is rotated the spot-like light passages are carried in succession across the path. As each passage moves across the path it scans a line. The spiral arrangement of the passages results in a series of lines being scanned and each revolution of the disk makes a complete scan of the scene or picture.

In making the scanning screen the coating 3 is preferably applied on the transparent disk 2 as a light sensitive emulsion, and the coating 3 is rendered opaque with the transparent spots therein by photographic means. In other words, the disk 2 is a photographic plate. Any suitable camera-like arrangement, such as that shown in Figure 4, may be employed for exposing the photographic plate or disk. In the arrangement shown the disk 2 is mounted for rotation with a shaft 7 and is positioned within a light tight box 8.

The shaft 7 is connected with a suitable precision instrument, such as the indexing head 9, for turning the disk through a predetermined angle. A shutter and focusing head 11 is provided in the camera 8 and is positioned to expose portions of the light sensitive coating 3 on the disk 2. A screen 12 having a spot 13 is positioned in front of the camera, so that the spot may be focused on the light sensitive coating. By properly focusing the spot the image thereof on the coating 3 may be adjusted to a predetermined size, and a sharply defined photographed spot in the order of five thousandths of an inch in diameter, or smaller, may be readily secured.

The screen 12 is mounted on a block 14 which in turn is slidably mounted in a frame 16. A micrometer screw 17 having an indexed dial 18 is journaled in the frame 16 and threaded into the block 14. By this arrangement the spot 13 may be moved vertically in small and accurate predetermined increments. It is to be understood of course that the spot is focused on the coating of the disk 2 at a point which lies in a vertical line passing through the axis of the shaft 7.

The operation of the camera arrangement is as follows: With the disk 2 mounted on the shaft 7 the indexing head 9 is adjusted so that the disk may be moved through a predetermined angle. This angular displacement depends upon the number of lines to be scanned or the number of spots making up the spiral on the disk. For example, if the width of the path of the scanning rays, normal to the direction of movement of the spots, is one inch, two hundred spots on the disk would mean that the scene or picture would be scanned to two hundred lines per inch. In this event the indexing head would be adjusted to make an angular displacement of three hundred and sixty divided by two hundred, or one degree and forty-eight minutes.

Two hundred spots scanning lines across the one inch dimension of the scanning ray path means that each spot would have to have a diameter of one divided by two hundred or five thousandths of an inch. With the screen 12 positioned in front of the camera the spot 13 is focused on the disk until the image is of the proper size. The screen 12 is then adjusted vertically until the image of the spot will appear at the beginning or outer point of the spiral. The shutter of the camera is then opened to expose a portion of the light sensitive coating 3.

After this exposure has been made the screen 12 is moved by the micrometer screw 17 so that the spot 13 is lowered five thousandths of an inch. The disk is then moved through the one degree and forty-eight minutes angle by means of the indexing head 9 and another exposure made. The above operation of turning the disk, lowering the spot and making an exposure is repeated until a complete revolution of the disk has been made. This will provide two hundred spots on the disk in the curve of a spiral.

The spacing between the spots on the disk is determined by the width of the path of the scanning rays in the direction of movement of the spots. The proper spacing may be secured by properly choosing the size of the disk. After the disk has been completely exposed the same is removed from the camera in a dark room and developed in any known manner so that the coating 3 is rendered opaque and the photographed spots 4 appear in the opaque area as minute transparent spots.

Figure 4:
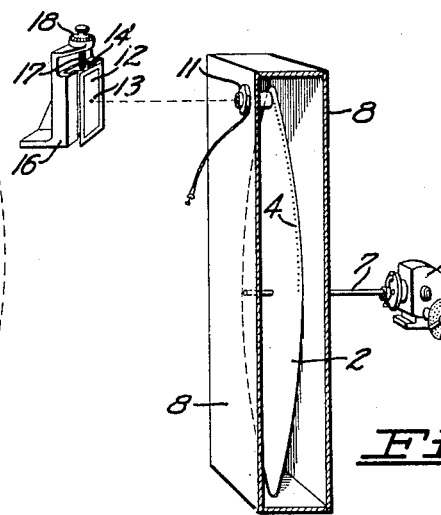
Figure 4 is a diagrammatic view showing the manner of photographing the spots on the disk; the camera being shown in section to illustrate the construction more clearly.
Figure 3:
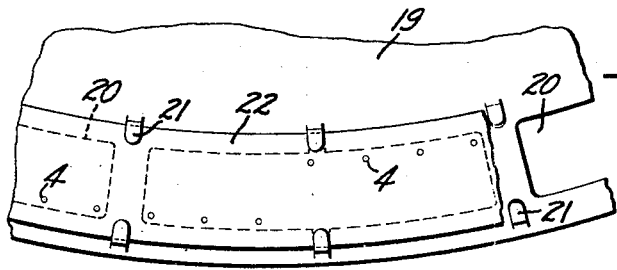
Figure 3 is a similar view of an alternate construction in which a photographic film is utilized; in this case a non-transparent disk, such as metal, may be employed.

A variant construction of the disk embodying my invention is shown in Figure 4. In this embodiment the disk 19 is not necessarily transparent and may be made of any suitable material, such as metal. Adjacent the periphery of the disk 2 a plurality of preferably slot-like apertures 20 are provided, and the transparent sheet is in the nature of a photographic film 22 suitably secured over the apertured portions of the disk 19. Clamp tongues 21 formed from or fixed on the body of the disk 19 may conveniently be employed for securing the film to the disk; or any other suitable method of securing the film may be used. When the film is placed on the disk it is preferably in the light sensitive condition and the disk is mounted in a camera similar to that described in connection with Figure 3. In the present instance the light sensitive emulsion which receives the impression is carried by the photographic film 22. The transparent spots 4 are formed as previously described.

Figure 5:
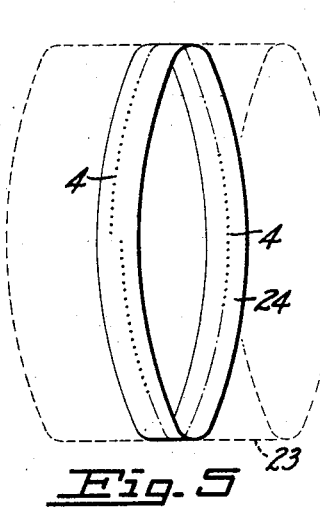
Figure 5 is a diagrammatic view showing a modified form of the scanning screen of my invention, as embodied in a drum construction.

An alternate form of the screen construction is shown diagrammatically in Figure 5. In this case a drum 23 is provided with apertures similar to the apertures 20 of Figure 3, and a photographic film band 24 is mounted on the drum over the apertures. Of course the drum may be formed of a glass cylinder having a band of light sensitive emulsion coated thereon. In either case the spots 4 are photographically formed as already explained, but extending in the curve of a helix about the drum. In operation the drum is positioned so that a wall thereof extends across the path of the scanning rays in a known manner.

The spots photographed upon the light sensitive emulsion may be round or square in shape. Obviously a square spot would pass more light than a round one having a diameter equal to one side of the square, and to the extent that it is recognizable by the eye, the evenness and brilliance of the picture would be enhanced by the use of a square spot.

In conclusion it is pointed out that the scanning screen embodying my invention will scan a sufficiently large number of lines per inch to give a pleasing reproduction of an object or scene. An important feature of the invention resides in the fact that the minute transparent areas or light passages may be easily and accurately formed and positioned. The improvements of my invention over the present Nipkow disk will be appreciated when it is understood that my invention eliminates the problems and limitations, such as the drilling of a large number of small holes, connected with the mechanical fabrication of the Nipkow disk.

I claim:

1. The method of making a Nipkow type of scanning disk, which comprises forming a circular transparent sheet, applying a light sensitive coating on the sheet, exposing a portion of the sensitized sheet to impress thereon the image of a spot, rotating the sheet thru a predetermined angle, moving the spot a predetermined distance, again exposing a portion of the sensitized sheet so that another image of the spot is impressed thereon, repeating the steps of rotating the sheet, moving the spot and exposing portions of the sensitized sheet so that a spiral of the images is impressed on the sheet, and developing the sheet to render the coating opaque with the images appearing therein as transparent spots.

2. The method of making a scanning screen, which comprises applying a light sensitive coating on a transparent sheet, exposing a portion of the sensitized sheet to impress thereon the image of an object, effecting a predetermined relative movement between the sheet and the object, again exposing a portion of the sensitized sheet so that another image of the object is impressed thereon, repeating the steps of effecting the relative movement between the sheet and the object and exposing portions of the sensitized sheet so that a series of objects is impressed on the sheet, and developing the sheet to render the coating opaque with the images appearing thereon as transparent areas.

3. The method of making a Nipkow type of scanning disk, which comprises forming a circular transparent sheet, applying a light sensitive coating on the sheet, exposing a portion of the sensitized sheet to impress thereon the image of an object, effecting a predetermined relative movement between the sheet and the object, again exposing a portion of the sensitized sheet so that another image of the object is impressed thereon repeating the steps of effecting the relative movement between the sheet and the object and exposing portions of the sensitized sheet so that a series of spirally arranged images is impressed on the sheet, and developing the sheet to render the coating opaque with the images appearing thereon as transparent areas.

In testimony whereof, I have hereunto set my hand.

HAROLD E. SORG.